United States Patent [19]

Neff

[11] Patent Number: 5,270,625

[45] Date of Patent: Dec. 14, 1993

[54] PNEUMATIC/ELECTRIC ACTUATOR

[75] Inventor: Edward A. Neff, Rancho Santa Fe, Calif.

[73] Assignee: Systems, Machines, Automation Components, Murrieta, Calif.

[21] Appl. No.: 930,986

[22] Filed: Aug. 17, 1992

Related U.S. Application Data

[63] Continuation-in-part of Ser. No. 765,130, Sep. 25, 1991.

[51] Int. Cl.$^5$ ............................................. G05B 11/01
[52] U.S. Cl. ..................................... 318/560; 364/487; 364/488; 74/2
[58] Field of Search ...................... 74/2; 364/487, 488; 318/560

[56] References Cited

U.S. PATENT DOCUMENTS

| | | | |
|---|---|---|---|
| 4,423,642 | 1/1984 | Kuboichi | 74/2 |
| 4,563,908 | 11/1986 | Shube | 74/2 |
| 4,759,124 | 7/1988 | Snyder et al. | 29/834 |
| 4,913,613 | 4/1990 | Hirschmann | 414/751 |
| 5,175,456 | 12/1992 | Neff et al. | 310/13 |

*Primary Examiner*—William M. Shoop, Jr.
*Assistant Examiner*—Karen Masil
*Attorney, Agent, or Firm*—Nydegger & Associates

[57] ABSTRACT

A pneumatic/electric actuator for precisely positioning a workpiece and for applying a force to the workpiece. The pneumatic/electric actuator includes an electric actuator in the form of a voice coil motor having an output rod coupled to the cylinder rod of a pneumatic cylinder. The output rod is mounted for extremely precise and measured movements by the electric actuator and can be adapted to contact and precisely position the workpiece. After precise positioning of the workpiece the pneumatic cylinder can be actuated to extend the cylinder rod and exert a force through the output rod to the workpiece. In an alternate embodiment the electric actuator is mounted directly on a pneumatic cylinder and can be moved by the pneumatic cylinder to increase an effective stroke of the output rod of the electric actuator.

9 Claims, 3 Drawing Sheets

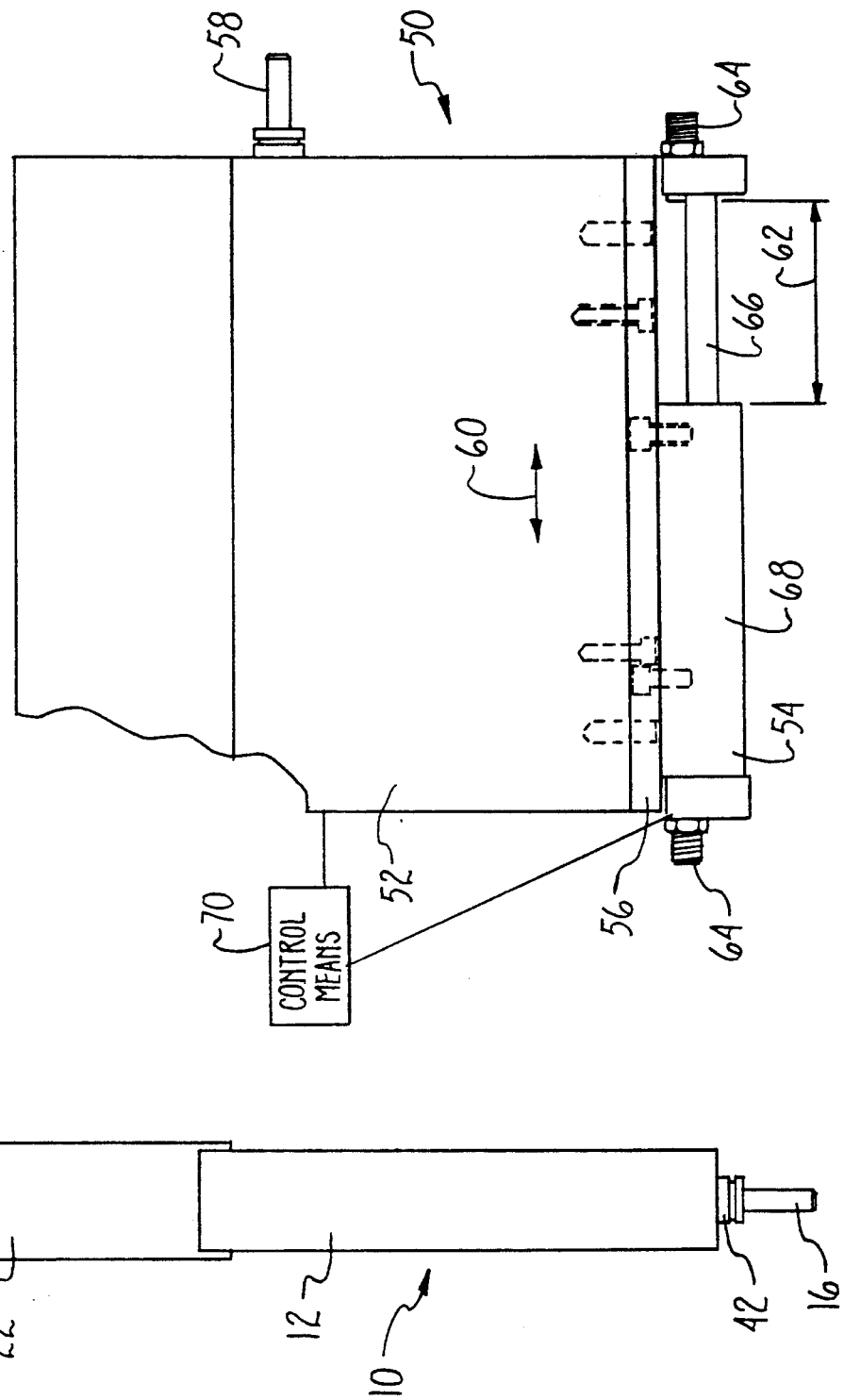

PNEUMATIC/ELECTRIC ACTUATOR

CROSS-REFERENCE TO RELATED APPLICATIONS

This application is a continuation-in-part of application Ser. No. 07/765,130 entitled "Actuator", and filed on Sep. 21, 1991.

TECHNICAL FIELD

This invention relates to automated manufacturing and more particularly to an actuator for precisely locating and applying a force to a component part during an assembly process.

BACKGROUND OF THE INVENTION

In an automated manufacturing setting, actuators perform basically two functions. Actuators are used to move work and to apply useful force to the work. Sometimes it may be desirable to combine both of these functions in a single actuator. As an example in the manufacture of a part, it may be necessary to move a cutting tool into position with respect to the part and then to apply some force to the cutting tool to shape the part. In the assembly of a multi component part, it may be necessary to precisely locate or position a part in the assembly and then apply a known force to the part in order to perform an operation of the assembly procedure.

In general a useful goal in the design of any automated manufacturing equipment is to engineer the simplest lowest cost system that will successfully perform the work. Prior to 1975 machine tools moved cutting tools in and out of position using hydraulic servo valves. Such servo valves enable the system to be designed to achieve multiple precise positioning at varying speeds. The advent of inexpensive computer controls led to the almost complete replacement of such devices with electric servo and stepper devices. Hydraulic devices are now primarily used in high force applications.

In automated assembly or automated inspection of parts, components of the system must meet multiple requirements. Among these requirements are precision movement and precise positioning of parts and feedback that a movement of the part was successful. These requirements are even more difficult with small or lightweight parts. An assembly may sometimes also require the application of a large force upon the part at the end of the movement.

Electrical devices are good for fast and precise variable movement. Electrical devices also provide good position feedback. On the other hand, electrical devices must be relatively large to exert substantial forces. A drawback of large electrical devices is that inertia limits the speed of a large device. This slows down the speed of the operation. In addition large electrical devices consume a large quantity of electricity.

The present invention recognizes that pneumatic devices can complement electrical devices in accomplishing this type of work in automated applications. Air devices can supply large forces in a small lightweight package. Air cylinders, however, can not be variably moved and precisely positioned because variable sensing is lacking and air is a compressible fluid. A combination of an air and electric device, however, can be used to achieve both objectives.

The present invention utilizes small high speed electric devices such as the electric actuators disclosed in the above cited parent application in combination with a pneumatic actuator. With such a combined system the electric actuator can be used to precisely position or locate the work and the pneumatic actuator to apply a known force to the work. In this application, the electric actuator provides precision movement and the pneumatic actuator provides a desired force. In an alternate embodiment of the invention, a pneumatic actuator can be used to move the work through a relatively large distance (dumb movement) and an electric actuator as disclosed in the above cited parent application, can be used to precisely and variably position (i.e. precise movement) the work prior to or following the large movement.

Accordingly it is an object of the present invention to provide an actuator for precisely moving or contacting a part and then for applying a relatively large force to the part. It is another object of the present invention to provide an electric/pneumatic actuator in which a part can be precisely and variably positioned or contacted using an electric actuator and then a force can be applied to the part using a pneumatic actuator. Still another object of the present invention is to provide a pneumatic/electric actuator in which a relatively large movement can be achieved using a pneumatic actuator or the like and the large movement precisely and variably controlled at either end of the large movement with an electric actuator. Yet another object of the present invention is to provide an pneumatic/electric actuator that is compact and relatively inexpensive to manufacture and use.

SUMMARY OF THE INVENTION

In accordance with the present invention a novel pneumatic/electric actuator for high speed positioning and force application to a workpiece or part such as a light weight component of an assembly is provided. The pneumatic/electric actuator comprises an electric actuator for contacting and precisely positioning the part and a pneumatic actuator for applying a force to the part. The electric actuator includes an output rod that is mounted for extremely precise and variable measured movements. The movement of the output rod is controlled by the application of electrical energy to coil piston slidingly mounted within an electrical field. An optical encoder senses the position of the output rod and is connected to a control means such as a computer or microprocessor for controlling the operation of the electric actuator and pneumatic actuator.

The electric actuator and pneumatic actuator are mounted to one another in a single actuator. The pneumatic actuator includes an air cylinder having a cylinder rod. The cylinder rod of the pneumatic actuator and the output rod of the electric actuator are connected to a common interface block of the electric actuator for movement with a coil piston of the electric actuator.

In use, the electric actuator can be controlled such that the output rod can be extended to contact and precisely position the workpiece or part. The amount of this movement can be varied as required. Movement of the output rod also moves the cylinder rod of the pneumatic cylinder. Upon precise positioning of the workpiece or part, actuation of the pneumatic cylinder applies a desired force to the workpiece or part. Air pressure is then exhausted and then the electric actuator can be used to retract the output rod.

In an alternate embodiment, the electric actuator is mounted to a pneumatic actuator for movement by the pneumatic actuator. The pneumatic actuator is adapted to provide a relatively large movement or stroke for contacting and positioning the part. (i.e. dumb movement) The output rod of the electric actuator is adapted to precisely position (i.e. precise movement) the part at the end (or beginning) of the long movement.

The novel features of this invention, as well as the invention itself, both as to its structure and its operation, will be best understood from the accompanying drawings, taken in conjunction with the accompanying description, in which similar reference characters refer to similar parts.

BRIEF DESCRIPTION OF THE DRAWINGS

FIG. 2 is a side elevation view of FIG. 1;

FIG. 3 is a side elevation view of a pneumatic/electric actuator constructed in accordance with an alternate embodiment of the invention adapted to move a part through a relatively large stroke, followed (or preceded) by precise positioning of the part.

DESCRIPTION OF PREFERRED EMBODIMENTS

Figure 1:
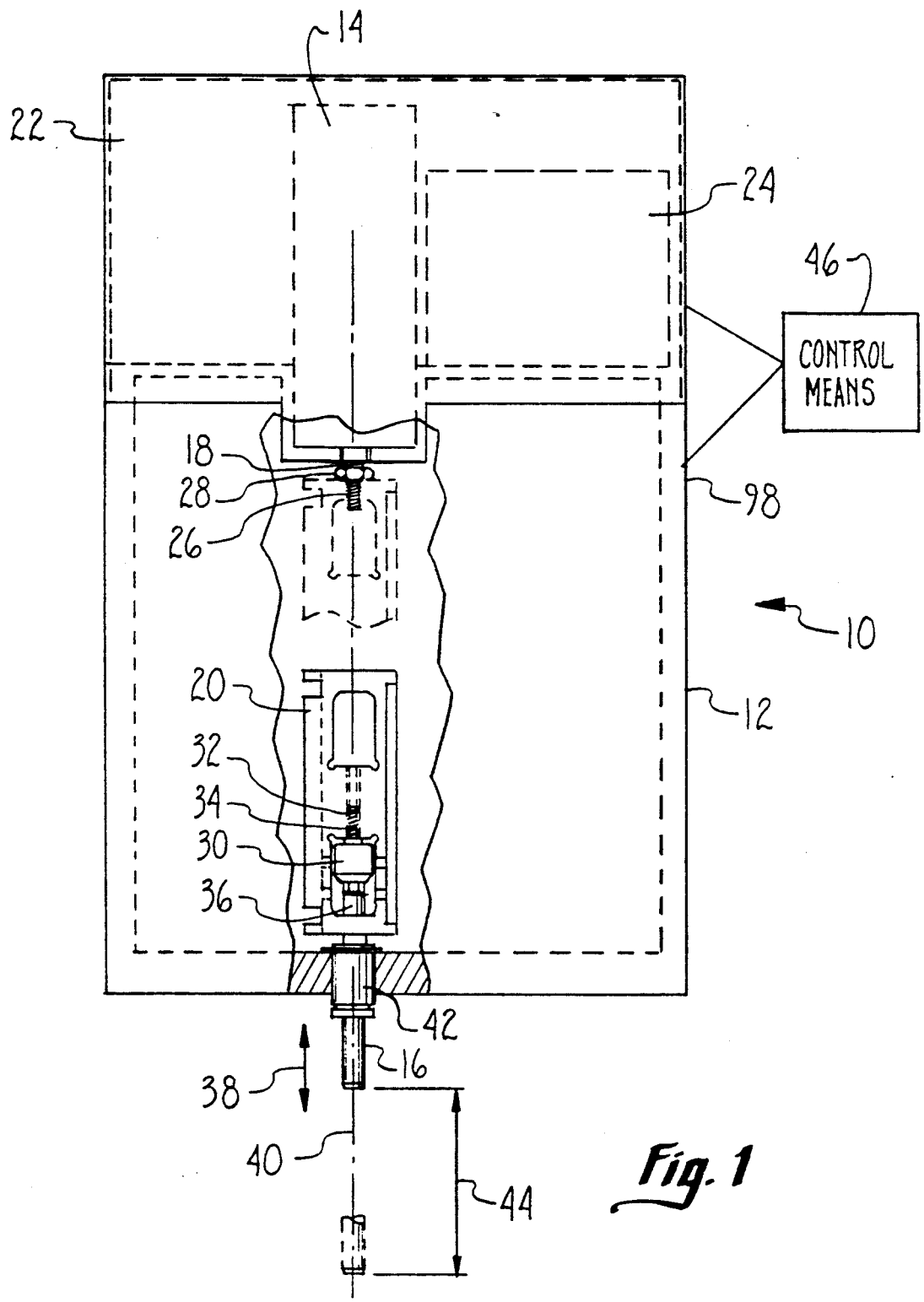
FIG. 1 is a schematic plan view partially cut away of a pneumatic/electric actuator constructed in accordance with the invention adapted to precisely position a part followed by the application of a force to the part.

Referring now to FIG. 1 a pneumatic/electric actuator constructed in accordance with the invention is shown and generally designated as 10. The pneumatic/electric actuator 10, generally stated, includes; an electric actuator 12, a pneumatic actuator 14 coupled to the electric actuator 12, and an output rod 16 coupled to both the electric actuator 12 and pneumatic actuator 14 for precisely moving or contacting a workpiece or part (not shown) and for applying a force to the workpiece or part.

Simply stated, the electric actuator 12 is adapted to precisely move the output rod 16 for contacting and moving the workpiece. Upon contact or precise positioning of the workpiece, the pneumatic actuator 14 is adapted to extend and apply a force through the output rod 16 to the workpiece. Air can then be exhausted from the pneumatic actuator 14 and the electric actuator 12 can be actuated to retract the output rod 16 and the cycle can be repeated.

Figure 4:
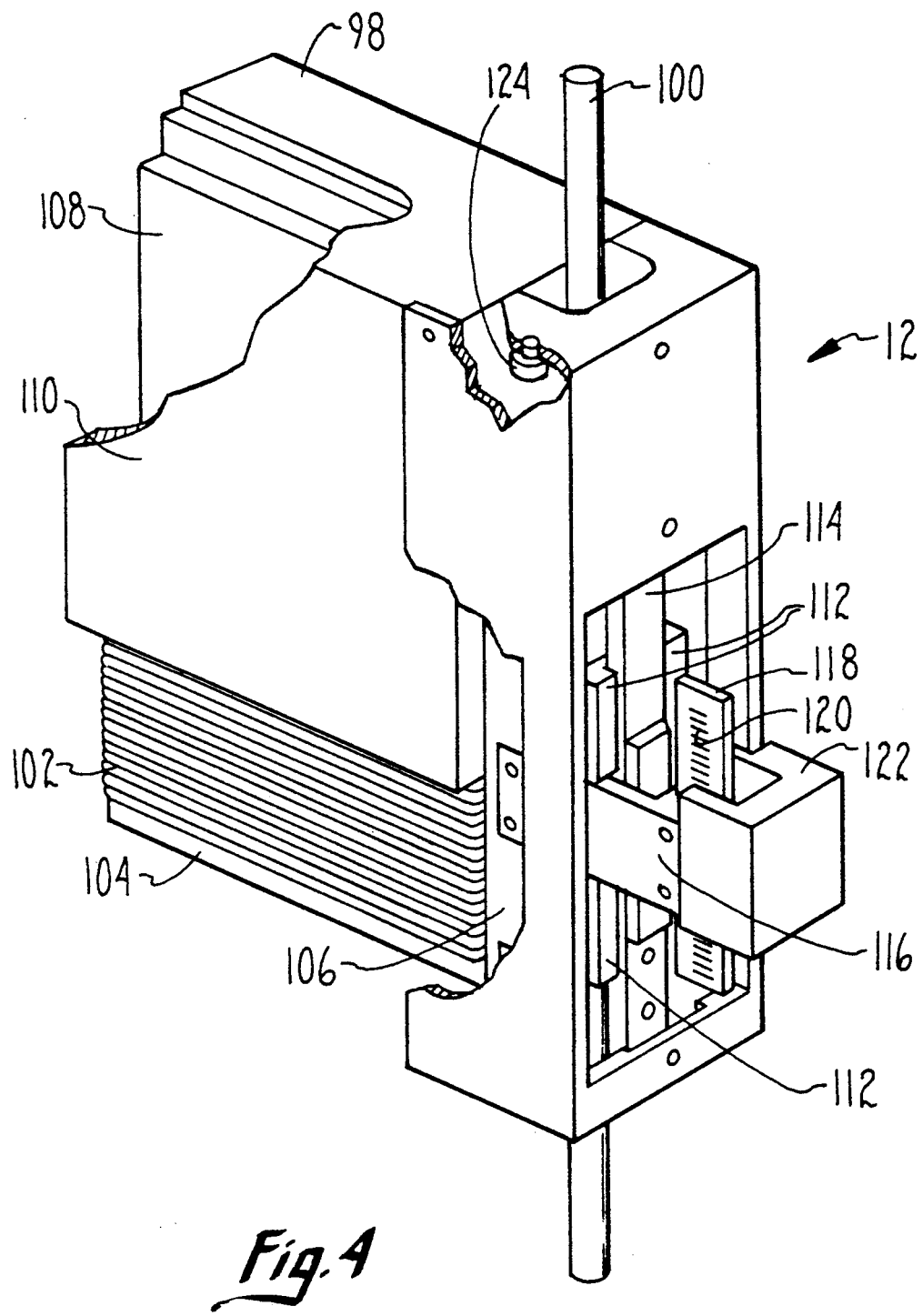
FIG. 4 is a perspective view of an electric actuator which can be modified for use with a pneumatic/electric actuator constructed in accordance with the invention.

The electric actuator 12 is preferably an actuator as described in the above noted parent application, U.S. patent application Ser. No. 07/765,130 which is incorporated herein by reference. Such an electric actuator 12 is shown in FIG. 4 and includes a generally rectangular shaped housing 98 having a rod 100 (or grip) that is mounted on a coil piston 106. For simplicity all of the details of construction of the electric actuator 12 are not shown in the present application but are shown and described in detail in the parent application.

As a general description of the electric actuator 12, the coil piston 106 is formed with an open passageway in surrounding relationship with a magnet 108. A magnet return 110 is also provided. The coil piston 106 is fixedly attached to a linear bearing 112 slidingly mounted on a bearing rail 114. A conductive wire is wrapped around the coil piston 106 to create a coil 102. In operation a source of electrical current is applied to the coil 102. Because the coil 102 is disposed in the magnetic field that is generated by the magnet 108 and magnet return 110, current flow through the coil 102 creates a force on the coil piston 106. This force then moves the coil piston 106 and rod 100 relative to the housing 98.

A position sensor such as an optical encoder 122 can be used to calibrate movement of the rod 100 and to establish its start and stop points. A bracket 116 is fixedly attached to the linear bearing 112 and to a glass encoder slide 118 with a scale 120 etched or printed thereon. Further, signals generated by the optical encoder 122 can be used to control the operation and movement of the coil piston 106. A control means 46 (FIG. 1) such as a microprocessor compares the actual position of the coil piston 106 (as indicated by the optical encoder 122) with a preset desired position of the coil piston 106. This comparison will generate an error signal. Depending on the magnitude of this error signal, control of the coil piston 106 can be accomplished by moving the coil piston 106 in a manner which will reduce the error signal to zero. Another magnet 124, shown fixedly mounted on the housing 98 is electrically activated to magnetically engage with a magnet on rod 100 to hold the rod 100 in a detent position during the idle time for the electric actuator 12.

Referring again to Figure the present invention uses such an electric actuator 12 but with the cylinder rod 18 of the pneumatic actuator 14 and the output rod 16 of the pneumatic/electric actuator 10 rather than a single rod 100 as described in the above cited parent application, being coupled to movement of the coil piston 106. Such a linear actuator can be a LA-24 Linear Actuator manufactured by SMAC Corporation, Murrieta, California, assignee of the present application, but with the rod replaced by the cylinder rod 1B and output rod 16 of the pneumatic/electric actuator 10 as hereinafter described.

An interface block 20 mechanically couples the cylinder rod 18 of the pneumatic actuator 14 and output rod 16 of the pneumatic/electric actuator 10 to the coil piston 106 of the electric actuator 12. Movement of the coil piston 106 of the electric actuator 12 thus moves the cylinder rod 18 and output rod 16.

The pneumatic actuator 14 may be a standard pneumatic cylinder adapted to extend and retract the cylinder rod 18. The pneumatic actuator 14 may be mounted in a housing 22 attached to the housing 98 of the electric actuator 12 in a stacked arrangement. A pilot valve 24 mounted within the housing 98 and coupled to a source of compressed air (not shown) controls the operation of the pneumatic actuator 14.

The cylinder rod 18 of the pneumatic actuator 14 is threaded and may be attached to a threaded opening 26 of the interface block 20 of the electric actuator 12. A nut 28 can also be used to secure the cylinder rod 18 of the pneumatic actuator 14 to the interface block 20. In use of the pneumatic/electric actuator 10 actuation of the electric actuator 12 is used to initially move or extend the cylinder rod 18 while the output rod 16 of the pneumatic/electric actuator is precisely moved to contact and position the workpiece. Air pressure to the pneumatic actuator 14 is controlled during this movement such that only the seal friction of the pneumatic actuator 14 must be overcome by the electric actuator 12 to move the cylinder rod 18. After the workpiece is precisely positioned, compressed air can be directed into the pneumatic actuator 14 using the pilot valve 24 for extending the cylinder rod 18 to apply a force to the workpiece.

The output rod 16 is also coupled to the interface block 20 for movement with the coil piston 106 of the electric actuator 12. A compliant joint 30 is used to connect the interface block 20 to the output rod 16 to insure that side loads placed on the output rod 16 by the workpiece are not transferred to the coil piston 106 of the electric actuator 12.

The compliant joint 30 may be a floating joint having a ball member universally mounted in a socket. The opposite ends of the compliant joint are thus free to move relative to one another to provide for any misalignment (i.e. eccentric slide, radial deflection) between the interface block 20 and output rod 16. Such compliant joints are well known in the art and are commercially available.

For attaching the interface block 20 to the compliant joint 30 a threaded opening 32 in the interface block 20 may be provided. A first threaded end 34 of the compliant joint 30 attaches to the threaded opening 32. A second threaded end 36 of the compliant joint 30 attaches to a threaded opening of the output rod 16.

With this arrangement the output rod 16 is adapted to move with the interface block 20 along a longitudinal axis 40 of the output rod 16 as indicated by double headed arrow 38. The longitudinal axis 40 of the output rod 16 is coincident with the longitudinal axis of the cylinder rod 18. A linear bushing 42 is provided in the housing 98 of the electric actuator 12 for guiding the linear movement of the output rod 16. A stroke of the output rod 16 is indicated by distance 44. For an LA-25 linear actuator, as the electric actuator 12, as previously specified, this stroke is on the order of about two inches.

A control means 46 such as a computer, microprocessor, or the like may be coupled to the pneumatic actuator 12 and the electric actuator 12 to coordinate and control the operation and movement of the pneumatic/electric actuator 10. Operation of the control means 46 may be using preprogrammed instructions as is known in the art.

OPERATION

The pneumatic/electric actuator 10 constructed in accordance with the invention can be used to precisely and variably position a workpiece and then to apply a compressive force to the workpiece. In use the output rod 16 of the pneumatic/electric actuator 10 can be formed with a contact means (not shown) such as a clip or gripping surface for contacting or holding the workpiece. The structure and function of such a contact means will be dependent on the workpiece. As an example the workpiece may be a relatively light weight part or component of a larger assembly. In the manufacture of such an assembly it may be desirable to precisely locate the part in the assembly and then to force the part into engagement with another component of the assembly.

To begin a cycle of operation the electric actuator 12 may be actuated to extend the output rod 16 to precisely position the part as required by the particular application of the pneumatic/electric actuator 10. At the same time the cylinder rod 18 of the pneumatic actuator 14 is moved by the interface block 20 of the electric actuator 12 pulling the cylinder rod 18. During positioning of the output rod 16 by the electric actuator 12 there is no air pressure on the pneumatic actuator 14. In order to move the cylinder rod 18, then the electric actuator 12 must only overcome the breakout force and friction associated with the seals of the pneumatic actuator 14.

The operation of the electric actuator 12 can be controlled to precisely position the output rod 16. This can be done as explained in detail in the above cited parent application using preprogrammed instructions to the control means 46.

Once the part is precisely positioned as required, the control means 46 may instruct the pilot valve 24 to direct compressed air into the pneumatic actuator 14. The compressed air causes the cylinder rod 18 of the pneumatic actuator 14 to extend and exert a force through the output rod 16 to the part.

The pneumatic actuator 14 can then be controlled by operation of the pilot valve 24 to exhaust air pressure in the cylinder rod 18 and the electric actuator 12 can be cycled to retract the cylinder rod 18. The cycle of operation can then be repeated.

ALTERNATE EMBODIMENT

Referring now to FIG. 3 an alternate embodiment pneumatic/electric actuator is shown and generally designated as 50. The alternate embodiment pneumatic/electric actuator 50 includes an electric actuator 52 mounted on a pneumatic actuator 54. An interface plate 56 connects the electric actuator 52 with the pneumatic actuator 54.

The electric actuator 52 is an actuator as previously described. The electric actuator 52 includes an output rod 58 that is adapted for precise linear movement by the electric actuator 52. This output rod 58 can be used to contact and precisely position a workpiece substantially as previously described. For increasing the stroke of the output rod 58 the entire electric actuator 52 is mounted for movement by the body 68 of the pneumatic actuator 54 as indicated by double headed arrow 60. The pneumatic actuator 54 can be a standard off the shelf double stroke cylinder arranged and mounted such that the body 68 of the cylinder can slide along one or more rod members 66. Stroke adjusters 64 may be provided at either end as stops.

This effectively increases the stroke of the output rod 58 by the distance 62. With this arrangement the pneumatic actuator 54 can be used to provide a relatively large stroke for the output rod 58 which can then be precisely positioned by the electric actuator 54 either before or after the long stroke. A control means 70 coupled to the electric actuator 52 and pneumatic actuator 54 controls the operation of the pneumatic/electric actuator 50.

While the particular Pneumatic/Electric Actuator as herein shown and disclosed in detail is fully capable of obtaining the objects and providing the advantages herein before stated, it is to be understood that it is are merely illustrative of the presently preferred embodiments of the invention and that no limitations are intended to the details of construction or design herein shown other than as described in the appended claims.

I claim:

1. A pneumatic/electric actuator for precisely positioning and applying a force to a workpiece comprising:
   an electric actuator including a housing, a magnet fixedly mounted to the housing to establish a magnetic field, a coil piston slidingly mounted to the housing, a coil wrapped around the coil piston, an interface block mounted on the coil piston, an output rod connected to the interface block for precisely and variably positioning the workpiece, and a sensor for determining the position of the output rod;

a pneumatic cylinder stacked onto the electrical actuator, the pneumatic cylinder having a cylinder rod connected to the interface block and to the output rod to exert a force through the output rod to the workpiece; and control means connected to the sensor for controlling current flow to the coil for precisely positioning the output rod and connected to the pneumatic cylinder for controlling movement of the cylinder rod.

2. The pneumatic/electric actuator as defined in claim 1 and wherein:
the interface block is connected to the output rod with a compliant joint.

3. The pneumatic/electric actuator as defined in claim 1 and wherein:
the cylinder rod of the pneumatic cylinder and output rod of the electric actuator are connected along a common longitudinal axis.

4. The pneumatic/electric actuator as defined in claim 1 and further comprising:
a pilot valve connected to a source of compressed air and to the pneumatic cylinder for operating the pneumatic cylinder.

5. The pneumatic/electric actuator as defined in claim 1 and wherein:
the sensor for the electric actuator is an optical encoder.

6. The pneumatic/electric actuator as defined in claim 1 and wherein:
the electric actuator can be controlled for moving the output rod for precisely positioning the workpiece and moving the cylinder rod while retraction of the cylinder rod moves the output rod back to a neutral position.

7. A pneumatic/electric actuator comprising:
an electric actuator having a housing, an output rod for precisely positioning a workpiece, a magnet fixedly mounted to the housing to establish a magnetic field within the housing, a coil piston slidingly mounted to the housing and disposed in the magnetic field generated by the magnet, a conductive wire wrapped around the coil piston such that current flow through the wire moves the coil piston and output rod relative to the housing; and a sensor means connected to the control means for sensing and controlling the location of the output rod;

a pneumatic cylinder having a body connected to the housing of the electric actuator through an interface plate for moving the body of the pneumatic cylinder along one or more cylinder rods to move the electric actuator through a distance for increasing a stroke of the output rod; and control means for controlling the electric actuator and pneumatic cylinder.

8. The pneumatic/electric actuator as defined in claim 7 and further comprising:
stroke adjustment means for adjusting the stroke of the pneumatic cylinder.

9. The pneumatic/electric actuator as defined in claim 8 and wherein:
the sensor for the electric actuator is an optical encoder.

* * * * *